(12) United States Patent  
Langer et al.

(10) Patent No.: US 8,714,830 B2  
(45) Date of Patent: May 6, 2014

(54) RADLAGEREINHEIT MIT FUNKTIONSKOMBINIERTEM WAELZNIETBUND

(75) Inventors: Roland Langer, Schwanfeld (DE); Peter Niebling, Bad Kissingen (DE); Florian Koeniger, Schweinfurt (DE); Berthold Krautkraemer, Gochsheim (DE); Johannes Schottdorf, Hammelburg (DE); Frank Eichelmann, Hassfurt (DE); Andreas Becker, Hammelburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 748 days.

(21) Appl. No.: 12/952,892

(22) Filed: Nov. 23, 2010

(65) Prior Publication Data

US 2011/0182541 A1      Jul. 28, 2011

(30) Foreign Application Priority Data

Nov. 24, 2009   (DE) .......................... 10 2009 055 657

(51) Int. Cl.
  *F16C 19/04*   (2006.01)
  *F16D 3/08*    (2006.01)

(52) U.S. Cl.
  USPC ............ 384/544; 384/548; 403/261; 464/160

(58) Field of Classification Search
  USPC ......... 384/448, 504, 544, 555, 559, 561–562, 384/571, 589, 548; 464/149, 160, 178, 182; 403/261
  See application file for complete search history.

(56) References Cited

U.S. PATENT DOCUMENTS

| | | | | | |
|---|---|---|---|---|---|
| 4,333,695 | A | * | 6/1982 | Evans | 384/562 |
| 4,835,829 | A | * | 6/1989 | Welschof et al. | 384/504 |
| 4,893,960 | A | * | 1/1990 | Beier et al. | 403/24 |
| 5,494,358 | A | * | 2/1996 | Dougherty | 384/448 |
| 5,536,075 | A | * | 7/1996 | Bertetti | 301/105.1 |
| 5,536,098 | A | * | 7/1996 | Schwarzler | 403/259 |
| 5,735,612 | A | * | 4/1998 | Fox et al. | 384/448 |
| 5,984,422 | A | * | 11/1999 | Seifert | 301/105.1 |
| 6,022,275 | A | * | 2/2000 | Bertetti | 384/544 |
| 6,203,441 | B1 | * | 3/2001 | Iarrera | 464/182 |
| 6,234,289 | B1 | * | 5/2001 | Baker et al. | 192/69.41 |
| 6,299,360 | B1 | * | 10/2001 | Dougherty et al. | 384/589 |
| 6,464,401 | B1 | * | 10/2002 | Allard | 384/561 |
| 6,574,865 | B2 | * | 6/2003 | Meeker et al. | 384/544 |
| 6,749,517 | B2 | * | 6/2004 | Ouchi | 384/544 |
| 7,670,059 | B2 | * | 3/2010 | Gradu et al. | 384/589 |
| 7,883,272 | B2 | * | 2/2011 | Kiuchi et al. | 384/544 |
| 2008/0089628 | A1 | * | 4/2008 | Kiuchi et al. | 384/544 |

* cited by examiner

*Primary Examiner* — Marcus Charles  
(74) *Attorney, Agent, or Firm* — Lucas & Mercanti, LLP

(57) ABSTRACT

A wheel bearing unit which has an outer ring, one or two inner rings and load-transmitting rolling elements arranged between the two rings. An orbitally formed shoulder of a wheel hub is provided for the pre-stressing of the wheel bearing unit via the inner ring, and a toothed ring which has an outward-facing radial tooth system is arranged on the inner ring, as is usual in wheel bearing units with all-wheel drive capability. The wheel bearing unit has a small axial width which benefits the handling characteristics of a vehicle by attaching the toothed ring to the orbitally formed shoulder and transmitting the drive torques via this attachment. Welding and a plastically formed tooth system on the orbitally formed shoulder are proposed as examples of such fastening.

10 Claims, 3 Drawing Sheets

RADLAGEREINHEIT MIT FUNKTIONSKOMBINIERTEM WAELZNIETBUND

FIELD OF THE INVENTION

The invention relates to a wheel bearing unit having an outer ring, an inner ring and load-transmitting rolling elements arranged between the two rings, an orbitally formed shoulder of a wheel hub pre-stressing the wheel bearing unit via the inner ring, and a toothed ring having an outward-facing radial tooth system being arranged on the inner ring. Instead of one inner ring the wheel bearing unit may also comprise two inner rings, which both have to support the load of the rolling elements, a one-piece or two-piece outer ring being provided.

In the past the orbitally formed shoulder has made it possible to offer wheel bearing units which can already be pre-stressed at the factory and only have to be bolted onto or pressed into the wheel carrier. This advantageously dispenses with an assembly process susceptible to error, in which the pre-stressing during the fitting of the wheel bearing unit had to be optimally adjusted. Since the pre-stressing of a wheel bearing is crucial to the service life of the latter, the manufacturer of rolling bearings is able to give extensive warranties on the product, since the latter is himself able to monitor the forming of the wheel bearing unit and thereby at the same time to adjust the pre-stressing.

BACKGROUND OF THE INVENTION

Prior Art

Both on driven wheel hubs and on undriven wheel hubs the orbitally formed shoulder represents a substantial technological improvement. In addition the orbitally formed shoulder is also used on wheel bearing units in which the torque transmission can be selectively engaged. Such wheel bearing units are encountered in all-wheel drive motor vehicles, in which an axle can be additionally coupled to the drivetrain when necessary. This is usually done by a radial tooth system, a toothed ring being fitted to the wheel hub of the wheel bearing unit to be driven, and by an internally toothed ring, which when necessary can be moved in engagement largely free from play axially over the toothed ring. This radial tooth system, creating a positively interlocking connection as required, serves to transmit torque from the drivetrain to the toothed ring and from the latter to the wheel hub, possibly by means of a second radial tooth system.

FIG. 1 shows a detail of a pre-stressed wheel bearing unit according to the prior art. The toothed ring 6 comprises an outward-facing radial tooth system 4, which can be connected to the drive shaft by a shift sleeve (not shown). The toothed ring 6 is pressed against a lateral face of the inner ring 3 by means of the orbitally formed shoulder 9 and is thereby situated in the force transmission chain for the pre-stressing of the bearing. Moreover the torques are transmitted from the toothed ring 6 radially via the tooth system 5 in the transmission direction 8 to the wheel hub 7. The toothed ring 6 therefore makes it possible to transmit torque to the wheel hub without having to forfeit the advantageous characteristics of the pre-adjusted pre-stressing of the bearing.

FIG. 9 of U.S. Pat. No. 6,371,268 B1 discloses a similar wheel bearing unit having the characteristics described. This is a double-row wheel bearing unit having tapered rollers. The toothed ring 60e is fastened in the manner described by an orbitally formed shoulder and transmits the torques to the wheel hub 56e in a radial direction.

A problem has emerged, however, in that for a wheel bearing unit suitable for all-wheel drive two radial tooth systems (with the respective mating tooth systems) always have to be produced for the torque transmission and have to be designed with as little play as possible, that is to say with great precision. The manufacturing outlay is thereby considerable, and the manufacturing costs are very high compared to a permanently driven wheel hearing unit.

Another disadvantage to emerge is that the toothed ring has always led to an increased axial width in the case of a wheel bearing unit with all-wheel drive capability. As a result the joint housing has been displaced further into the vehicle interior, so that the angular displacement increased the steering radius with an adverse effect on the handling characteristics of the vehicle.

SUMMARY OF THE INVENTION

Object of the Invention

The object of the invention is therefore to develop a cost-effective wheel bearing unit with all-wheel drive capability, in such a way that said disadvantages do not occur.

The object is achieved by a wheel bearing unit of the type specified in the introduction in that the toothed ring is fastened to the orbitally formed shoulder for transmitting torque to the wheel huh.

The wheel bearing unit according to the invention comprises an outer ring, an inner ring and load-transmitting rolling elements arranged between the two rings, the orbitally formed shoulder of the wheel hub serving to pre-stress the rings and the rolling elements in relation to one another. The pre-stressing force is transmitted from the orbitally formed shoulder via the inner ring, via a row of rolling elements to the outer ring and then via a further row of rolling elements to the wheel huh or a further inner ring and then to the wheel hub. Since the orbitally formed shoulder forms a part of the wheel hub, the pre-stressing circle closes at this point.

In addition the toothed ring comprises an outward-facing radial tooth system and is arranged on the inner ring. The arrangement of the toothed ring on the inner ring may be an axial and/or radial arrangement in relation to the inner ring. The radial tooth system is intended, where necessary, to form a positively interlocking connection with an element of the drivetrain, in order to transmit torques to the toothed ring. A further positively interlocking connection of the toothed ring with the wheel hub serves to drive the latter.

According to the invention the toothed ring is fastened to the orbitally formed shoulder of the wheel hub in order to transmit torque to the latter. The orbitally formed shoulder thereby not only assumes its function in maintaining the pre-stressing of the bearing but also becomes the torque-receiving element of the wheel hub. This obviates the need for the positively interlocking connection to another part of the wheel hub, so that radially the toothed ring partially or entirely covers the orbitally formed shoulder and no longer have to be arranged axially next to one another. Consequently there is a saving in overall axial space, which can lead to an improved angular displacement of the vehicle.

In one advantageous embodiment the toothed ring comprises a toothed ring foot arranged radially inside the outward-facing radial tooth system and fastened to the orbitally formed shoulder. The function of the toothed ring foot is to establish at least one positively interlocking connection with the orbitally formed shoulder. Alternatively a cohesive material connection between the toothed ring foot and the orbitally formed shoulder is feasible. It is thereby possible to design the toothed ring foot largely independently of the outward-facing radial tooth system, in such a way that the toothed ring extends optimally up to the orbitally formed shoulder and is capable of transmitting the torque via the toothed ring foot. Thus it is feasible, for example, to arrange the outward-facing radial tooth system on a hollow cylindrical part of the toothed ring, to which the toothed ring foot, extending substantially in radial directions, is connected.

In one advantageous embodiment the toothed ring comprises a hollow cylindrical part bearing against the inner ring. The hollow cylindrical part may be intended initially to establish a non-positive connection to the inner ring, thereby affording an aid to installation, before the positively interlocking connection between the toothed ring and the orbitally formed shoulder has been made.

In one advantageous embodiment the outward-facing radial tooth system is formed on or applied to the outside of the hollow cylindrical part. This arrangement is suited to bracing the load in a radial direction and transmitting it to the inner ring.

In one advantageous embodiment the toothed ring foot comprises an internal tooth system. The internal tooth system is intended to establish a positively interlocking connection to the orbitally formed shoulder, using radial structures of the orbitally formed shoulder. These structures may be pins or protruding edges, for example, in which the internal tooth system of the toothed ring meshes. Here these structures may be produced wholly or in part by pressing on the toothed ring or they may already be present prior to the arrangement of the toothed ring.

In one advantageous embodiment the orbitally formed shoulder comprises a mating tooth system with a positive interlocking connection to the internal tooth system of the toothed ring foot. Such a mating tooth system allows an efficient transmission even of large torques, but requires a certain manufacturing outlay.

In one advantageous embodiment the mating tooth system is formed by plastic deformation when pressing into the internal tooth system of the toothed ring foot. Since as a rule the orbitally formed shoulder is scarcely subjected to a harder process, its material is also suited to a further plastic deformation in that a possibly hardened internal tooth system contributes to a formation of a mating tooth system on the orbitally formed shoulder. For this purpose the toothed ring is arranged at the intended point on the inner ring and the orbitally formed shoulder is deformed in such a way that the latter moves in a radial direction towards the internal tooth system on the toothed ring foot and meshes in the latter. This can be done by a rolling process of the orbitally formed shoulder, for example, which acts upon the orbitally formed shoulder in an axial direction and brings about a deformation in a radial direction. In the process a mating tooth system of the orbitally formed shoulder, which fits optimally into the internal tooth system of the toothed ring foot and therefore has no play, is advantageously formed.

The plastic formation of the mating tooth system can advantageously take place already during the orbital forming process. Here the selected internal tooth system diameter of the toothed ring foot is small, in such a way that in forming the wheel hub the orbitally formed shoulder is pressed with a positive interlock into the internal tooth system without any further cold forming.

In one advantageous embodiment the orbitally formed shoulder is connected to the toothed ring foot by cohesive material connection. The cohesive material connection may be produced by a welding process, for example, which serves to join the orbitally formed shoulder to the toothed ring foot at an atomic level. An alloy may be formed at the weld seam, since either the toothed ring foot and/or the orbitally formed shoulder and/or the weld filler is/are composed of different metals. The cohesive material connection means that torque is transmitted from the toothed ring to the orbitally formed shoulder in a way unique to components that can only be destructively separated.

An advantageous aspect of subsequently producing a cohesive material connection is that existing wheel bearing units with orbitally formed shoulder can be converted for all-wheel drive applications. This is done by arranging the toothed ring axially and/or radially in relation to the inner ring and at the same time radially enclosing the orbitally formed shoulder, at least in part. One or more cohesive material connections can then be made between the orbitally formed shoulder and the toothed ring by a circular weld seam or also by multiple spot welds. No internal tooth system of the toothed ring is necessary for this.

In one advantageous embodiment the toothed ring, prior to welding, comprises a radial inner extension as filler material. The weld seam, or the spot welds, must bridge the distances between the orbitally formed shoulder and the toothed ring foot. To do this the corresponding material would have to be placed in the weld pool by the welding process. In principle this is possible using welding filler rods or also by means of inert gas-shielded welding methods, but in both cases it requires a continuous feeding of material during the rolling process. It is more advisable, particularly with a view to automation, to arrange the necessary material inside the toothed ring foot beforehand in the form of an inner extension. It is therefore only necessary to produce the actual weld pool, obviating the need for any additional extraneous filler material.

Advantageously, the torque transmission from the toothed ring to the orbitally formed shoulder can not only take place via a tooth system and a mating tooth system, but at the same time can be assisted by a cohesive material connection. In the case of an all-wheel drive wheel bearing unit, for example, the positively interlocking connection of which is designed for relatively small torques, the all-wheel drive wheel bearing unit can thus be subsequently provided with circumferential spot welds or a continuous weld seam in the manner described for larger torques, the weld seam affording the facility for also transmitting larger torques.

Alternatively it is feasible, instead of an orbitally formed shoulder, to weld the toothed ring by its toothed ring foot directly onto the hollow cylindrical part of the wheel hub and for said ring to assume the function of the orbitally formed shoulder.

Further advantageous embodiments and preferred developments of the invention are set forth in the description of the figures and/or in the dependent claims.

BRIEF DESCRIPTION OF THE DRAWINGS

The invention will be described and explained in more detail below with reference to the exemplary embodiments represented in the figures, of which.

DESCRIPTION OF THE DRAWINGS

Exemplary Embodiment

Figure 1:
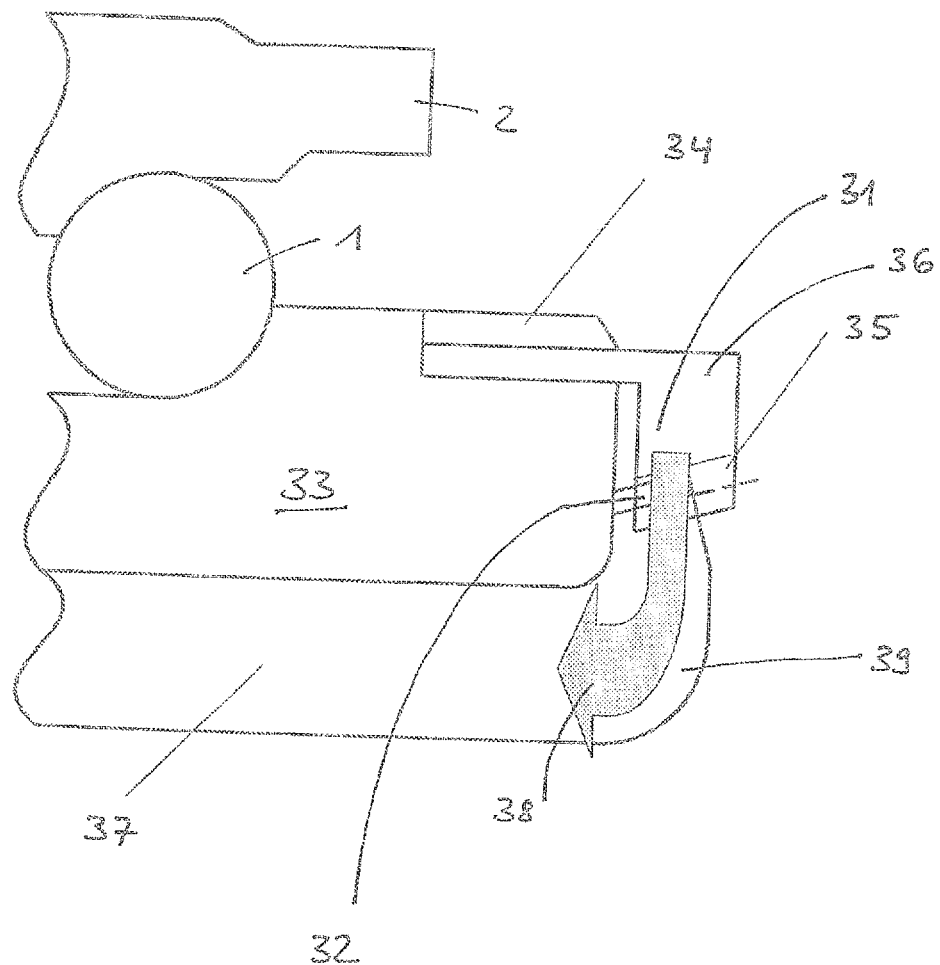
FIG. 1 shows a sectional view of a wheel bearing with all-wheel drive capability according to the prior art.

FIG. 1 shows a sectional view of a wheel bearing with all-wheel drive capability according to the prior art.

As has already been described in the introduction, the wheel bearing in question is a double-row angular-contact ball bearing having a one-piece outer ring 2, which transmits the load to the inner ring(s) 3 via the rolling elements 1. A multi-row tapered roller bearing would also be feasible.

The toothed ring 6 comprises an outward-facing radial tooth system 4, which is intended to interlock positively with an axially moveable transmission element, which establishes the desired positively interlocking connection as necessary and thereby also drives the vehicle by means of the selectively engageable wheel bearing.

The torque transmission direction runs radially inwards through the toothed ring 6 to the internal tooth system 5, which via a mating tooth system transmits torques to the wheel hub 7.

The pre-stressing of the bearing on the other hand is transmitted from the orbitally formed shoulder 9 via the toothed ring to the inner ring 3 and from there onwards in the otherwise usual manner.

Figure 2:
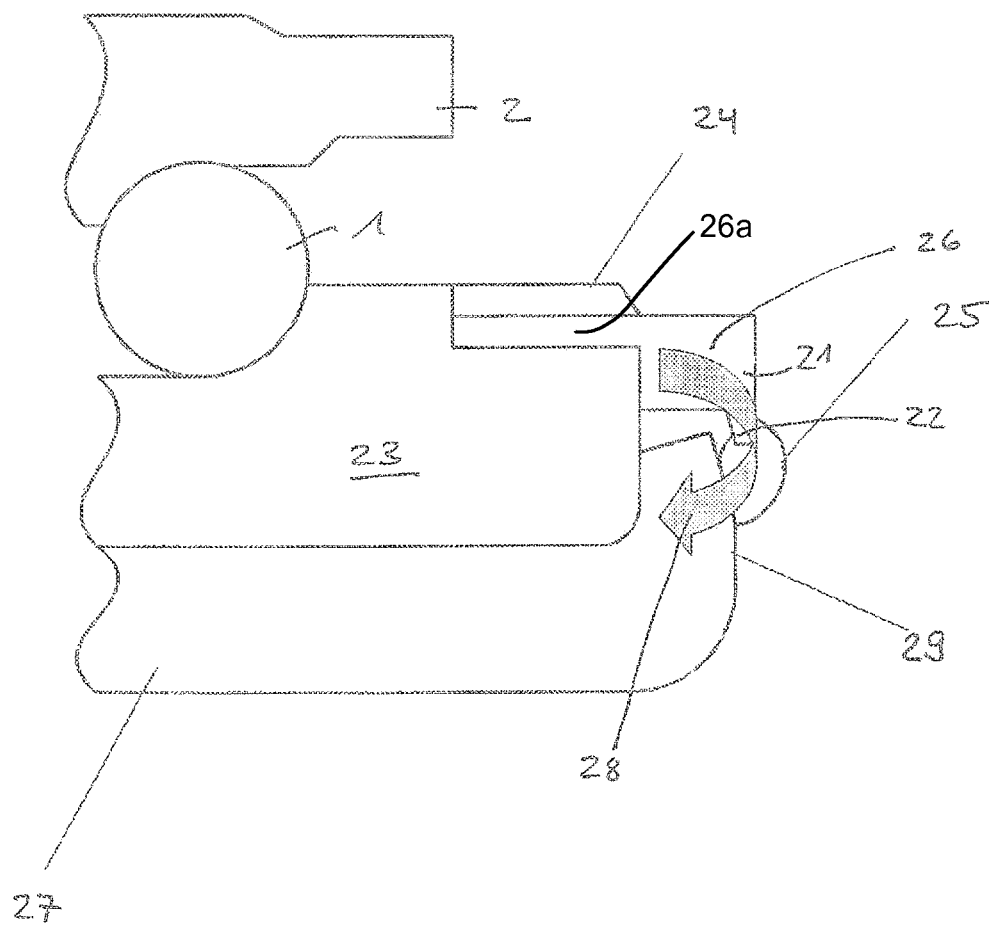
FIG. 2 shows a sectional view of a wheel bearing with all-wheel drive capability with welded toothed ring.

FIG. 2 shows a sectional view of a wheel bearing with all-wheel drive capability with welded toothed ring 26. The toothed ring 26 is enclosed in the inner ring 23 and adjoins the latter axially and radially. The toothed ring foot 21 is arranged axially on the inner ring 23 and radially encloses the orbitally formed shoulder 29.

The toothed ring 26 is advantageously pressed onto the inner ring 23, so that during the welding process no displacement can occur in an axial direction, for example due to local thermal expansions.

Beneath the toothed ring foot 21, axially facing the transmission mechanism, is a radial inner extension 22, which is formed on the toothed ring foot 21 and which covers the orbitally formed shoulder 29 not only radially but possibly also axially, but which in each case shortens the distance between the toothed ring foot 21 and the orbitally formed shoulder 29. This inner extension 22 can be used as filler material, which is not necessarily liquefied in the welding process but which owing to the reduced distance does considerably reduce the quantity of metal needed for the welding process. Ideally, however, the inner extension 22 provides all the metal needed for the welding.

After the welding process a weld seam 25 connects the toothed ring foot 21 to the orbitally formed shoulder 29. The weld seam 25 may have an annular structure, but may also consist of multiple annular segments or spots.

The torque transmission thereby takes place via the weld seam 25 in the torque transmission direction 28. This wheel bearing unit is advantageously optimized in terms of its overall axial width, because the toothed ring 26 does not need to extend radially up to the hollow cylindrical part of the wheel hub 27, but utilizes the already existing orbitally formed shoulder 29 for the transmission of torque.

The radial external tooth system 24 is applied to an outside of a hollow cylindrical part 26a of the toothed ring 26 and extends in the axial direction only far enough to allow the inner ring 23 also to brace a radial load. This is not always necessary, so that the radial external tooth system 24 may also extend radially over the toothed ring foot 21, thereby affording additional potential for optimization of the torque transmission.

The outward-facing radial tooth system 24 advantageously extends up to the seal unit (not shown) between the outer ring 2 and the inner ring 23, so that here too no overall axial space is wasted.

Figure 3:
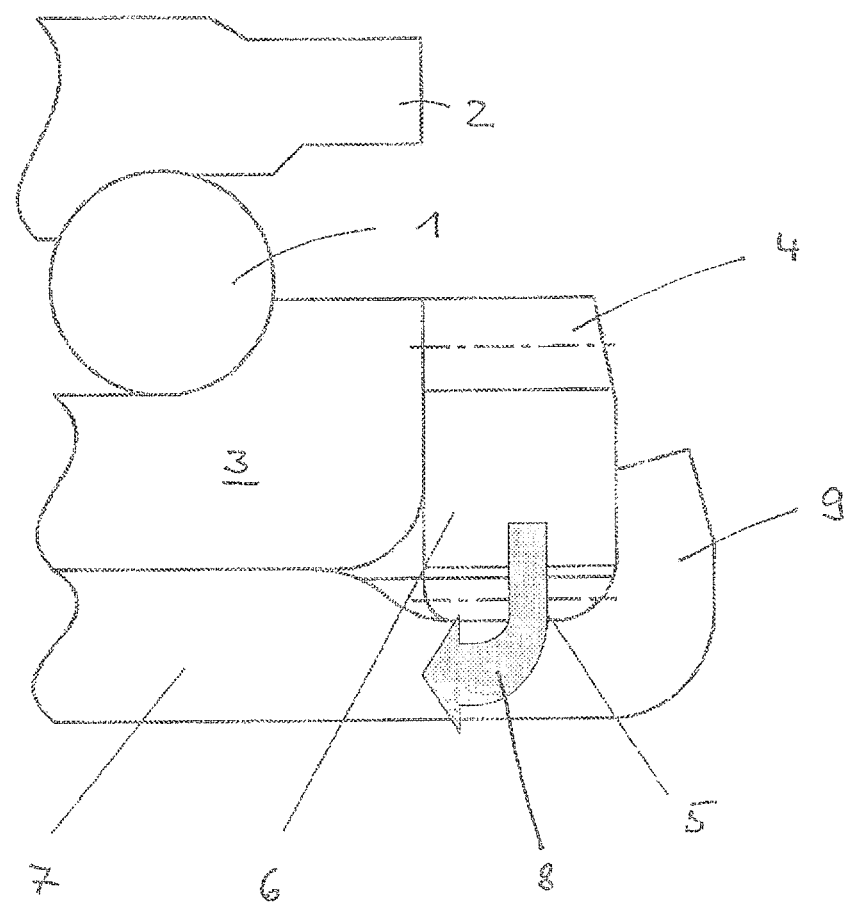
FIG. 3 shows a sectional view of a wheel bearing with all-wheel drive capability with plastically toothed orbitally formed shoulder.

FIG. 3 shows a sectional view of a wheel bearing with all-wheel drive capability with plastically toothed orbitally formed shoulder 39.

The exemplary embodiment in FIG. 3 substantially corresponds to that in FIG. 2, no cohesive material connection having been produced between the toothed ring 36 and the orbitally formed shoulder 39 of the wheel hub 37, but a positively interlocking connection instead having been obtained via an internal tooth system 35 with a mating tooth system 32. Consequently the torque transmission direction 38 also does not differ from torque transmission direction 28 in FIG. 2. Furthermore it is the same components, namely the toothed ring foot 31, which transmits moments radially to the orbitally formed shoulder 39, the latter passing the moments on in an axial direction to the wheel flange (not shown) via the wheel hub 37.

The orbitally formed shoulder 39 has been formed in a radial direction along the inner ring 33 by the orbital forming method known in the prior art, that is to say by means of a so-called snap. In the process the radially outer edge of the orbitally formed shoulder 39 has been formed into the internal tooth system 35 in such a way that a mating tooth system 32, which is connected by positive interlock and without radial play to the internal tooth system 35 of the toothed ring foot 31, has formed on the orbitally formed shoulder 39.

The internal tooth system 35 in question is advantageously an internal tooth system, the mean inside diameter of which is variable in an axial direction. In this case the diametric intervals of the tooth crests and also of the tooth notches arise from one another. In other words the profile of the tooth crests forms a straight line, which encloses an angle with the axis of rotation of the wheel bearing. The advantage to this is that in the orbital forming process the radial deformation movement of the orbitally formed shoulder 39 produces an axial pre-stressing of the toothed ring 36 in relation to the inner ring 33. This pre-stressing of the toothed ring 36 is not to be confused with the pre-stressing of the bearing, which is transmitted by the orbitally formed shoulder 39 directly to the inner ring 33, but serves to fasten the toothed ring 36 captively to the wheel bearing unit already during the orbital forming process. If the mean inside diameter of the internal tooth system 35 did not vary in a radial direction, there would be a risk that the toothed ring 36, particularly under corrosion or other environmental influences, might over time become axially detached from the orbitally formed shoulder 39. The radial external tooth system 34 is similar to the radial external tooth system 24 of the FIG. 2 embodiment.

It is particularly advantageous for multiple processes to run simultaneously during the orbital forming method. These include firstly the partial or complete adjustment of the stressing of the bearing, secondly the forming of the mating tooth system 32 and thirdly the attachment of the toothed ring 36 to the inner ring 33, as described.

Nevertheless it is possible in the case of a simpler all-wheel drive wheel bearing unit to provide a radially constant internal tooth system of the toothed ring foot. One possible solution in order to ensure that the toothed ring does not become axially detached would be a weld as described in the exemplary embodiment in FIG. 2. The tooth systems of the orbitally formed shoulder 39 and the toothed ring 36 do not stand in the way of a weld but assist this in that there is no radial play and therefore scarcely any filler material is needed. There is the additional effect that it may be possible to transmit a greater torque because of the weld seam or the spot welds.

To sum up, the invention relates to a wheel bearing unit having an outer ring, one or two inner rings and load-transmitting rolling elements arranged between the two rings, an orbitally formed shoulder of a wheel hub being provided for the pre-stressing of the wheel bearing unit via the inner ring, and a toothed ring having an outward-facing radial tooth system being arranged on the inner ring, as is usual in wheel bearing units with all-wheel drive capability. The intention is to specify a possible way of designing such a wheel bearing unit having a small axial width to the benefit of the handling characteristics of the vehicle. For this purpose it is proposed to attach the toothed ring to the orbitally formed shoulder and to transmit the drive torques via this attachment. Welding and a plastically formed tooth system on the orbitally formed shoulder are proposed as examples of such fastening.

List of Reference Numerals

1 Rolling element
2 Outer ring
3 Inner ring
4 Radial tooth system
5 Internal tooth system
6 Toothed ring
7 Wheel hub
8 Torque transmission direction
9 Orbitally formed shoulder
21 Toothed ring foot
22 Radial inner extension
23 Inner ring
24 Radial tooth system
25 Weld seam
26 Toothed ring
27 Wheel hub
28 Torque transmission direction
29 Orbitally formed shoulder
31 Toothed ring foot
33 Inner ring
34 Radial tooth system
35 Internal tooth system
36 Toothed ring
37 Wheel huh
38 Torque transmission direction
39 Orbitally formed shoulder

The invention claimed is:

1. A wheel bearing unit, comprising:
   an outer ring;
   an inner ring;
   load-transmitting rolling elements arranged between the outer ring and the inner ring;
   a wheel hub having an orbitally formed shoulder for pre-stressing the wheel bearing unit via the inner ring; and
   a toothed ring having an outward-facing radial tooth system arranged on the inner ring, the toothed ring being separate from the inner ring,
   wherein the toothed ring is fastened to the orbitally formed shoulder for transmitting torque directly to the wheel hub so that the torque is not transmitted through the inner ring.

2. The wheel bearing unit according to claim 1, wherein the toothed ring has a toothed ring foot arranged radially inside the outward-facing radial tooth system and fastened to the orbitally formed shoulder.

3. The wheel bearing unit according to claim 2, wherein the toothed ring foot has an internal tooth system.

4. The wheel bearing unit according to claim 3, wherein the orbitally formed shoulder has a mating tooth system connected by positive interlock to the internal tooth system.

5. The wheel bearing unit according to claim 4, wherein the mating tooth system is formed by plastic deformation when pressing into the internal tooth system of the toothed ring foot.

6. The wheel bearing unit according to claim 2, wherein the orbitally formed shoulder is connected to the toothed ring foot by cohesive material connection.

7. The wheel bearing unit according to claim 6, wherein the orbitally formed shoulder and the toothed ring foot are welded together.

8. The wheel bearing unit according to claim 7, wherein the toothed ring has a radial inner extension as filler material prior to welding.

9. The wheel bearing unit according to claim 1, wherein the toothed ring has a hollow cylindrical part bearing against the inner ring.

10. The wheel bearing unit according to claim 9, wherein the hollow cylindrical part has an outside and the outward-facing radial tooth system is formed on or applied to the outside of the hollow cylindrical part.

* * * * *